(12) United States Patent
Kitada

(10) Patent No.: US 6,566,633 B2
(45) Date of Patent: May 20, 2003

(54) THERMAL CONTROL APPARATUS AND METHOD FOR THERMALLY CONTROLLING A PLURALITY OF OBJECTS WITHIN A PREDETERMINED TEMPERATURE RANGE

(75) Inventor: Makoto Kitada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/781,230

(22) Filed: Feb. 13, 2001

(65) Prior Publication Data

US 2002/0027131 A1 Mar. 7, 2002

(30) Foreign Application Priority Data

Sep. 1, 2000 (JP) .......................... 2000-265499

(51) Int. Cl.[7] .................................. H05B 1/02
(52) U.S. Cl. ................ 219/486; 219/483; 219/497; 219/481; 219/501; 307/39; 307/40
(58) Field of Search .................. 219/483–486, 219/481, 506, 497, 501; 307/38–41

(56) References Cited

U.S. PATENT DOCUMENTS 4,090,062 A * 5/1978 Phillips et al. ............... 218/486
4,100,428 A * 7/1978 Delesle et al. ............... 307/117
4,160,153 A * 7/1979 Melander ..................... 219/486
5,015,826 A * 5/1991 Curti ............................ 219/492
6,157,008 A * 12/2000 Brown et al. ................. 219/486

FOREIGN PATENT DOCUMENTS

JP          4-5200          1/1992

* cited by examiner

Primary Examiner—Mark Paschall
(74) Attorney, Agent, or Firm—Burns, Doane, Swecker & Mathis, LLP

(57) ABSTRACT

When controlling operation of heaters or coolers provided in a plurality of thermal control objects, the priority for turning on the heaters or the coolers set based on temperature and speed of temperature response of the thermal control objects is used to turn on a heater or cooler with higher priority and turn off a heater or cooler with lower priority, such that the sum of energy required for operating the heaters and the coolers does not exceed a predetermined value. Consequently, it is possible to reduce the peak energy (maximum energy) generated when a plurality of heaters and coolers are simultaneously turned on, thereby decreasing an affect on an energy supply system.

11 Claims, 7 Drawing Sheets

|  |  | TEMPERATURE RESPONSE | | |
|---|---|---|---|---|
|  |  | FAST | MEDIUM | SLOW |
| TEMPER-ATURE DIFFERENCE Δt FROM MINIMUM REQUIRED TEMPER-ATURE (Tia) | Δt ≥ 3ΔT | OFF | | |
| | 2ΔT ≤ Δt < 3ΔT | HYSTERESIS ⑧ | HYSTERESIS ⑨ | OFF |
| | ΔT ≤ Δt < 2ΔT | ON ORDER ⑤ | ON ORDER ⑥ | HYSTERESIS ⑦ |
| | 0 ≤ Δt < ΔT | ON ORDER ② | ON ORDER ③ | ON ORDER ④ |
| | Δt < 0 | ON ORDER ① | | |

Fig. 2

THERMAL CONTROL APPARATUS AND METHOD FOR THERMALLY CONTROLLING A PLURALITY OF OBJECTS WITHIN A PREDETERMINED TEMPERATURE RANGE

BACKGROUND OF THE INVENTION

1. Field of the Invention

The present invention relates to a thermal control apparatus for applying simultaneous thermal control to a plurality of objects using heaters or the like, a space craft provided with said thermal control apparatus, and a thermal control method. For example, the present invention relates to thermal control for an artificial satellite, a space station, or a space craft such as a transporter for space navigation.

2. Related Art

FIG. 6 schematically shows a conventional thermal control system for an artificial satellite. The system includes a power source 1, and a calculator 6 for determining/instructing ON/OFF of heaters 3, as will be described below. The calculator 6 includes a heater ON/OFF determining circuit 7 for the heaters 3. A plurality of thermal control objects $2_1, 2_2, 2_3 \ldots 2_i \ldots$ (hereinafter will be referred to as "objects") are installed in an artificial satellite. For each of the objects 2 is provided a heater $3_1, 3_2, 3_3 \ldots 3_1, \ldots$, a temperature sensor $4_1, 4_2, 4_3 \ldots 4_i \ldots$, and a switch $5_1, 5_2, 5_3 \ldots 5_i \ldots$ for controlling ON/OFF of the heater 3 according to instructions from the calculator 6. In the drawing, numerals 2~5 have subscripts 1, 2, 3, ... i ... in this order from the top to indicate that a plurality of elements are provided. For an artificial satellite, the object 2 may include, for example, an electronic device for attitude control, communication, data processing, power supply or the like, a propeller device, and an antenna device, which are disposed in the satellite structure.

The operation of a conventional thermal control system for artificial satellites will be now described with reference to FIGS. 6 and 7. In this related art system, ON/OFF control for the heaters 3 is performed in the heater ON/OFF determining circuit 7 based on the logic depicted in FIG. 7.

First, at step S1, the temperature Ti of each object $2i$ is measured using the temperature sensor $4i$ mounted on the object $2i$. At step S2, the temperature Ti is compared with the lower limit control temperature Tia of the object $2i$. When Ti<Tia, the calculator 6 instructs the switch $5i$ to be ON according to step S3, so that the heater $3i$ is turned on to raise the temperature Ti. When Ti≧Tia at step S2, the temperature Ti is further compared with the upper limit control temperature Tib of the object $2i$ at step 4. When Ti≧Tib, the calculator 6 instructs the switch $5i$ to be OFF according to step S5, such that the heater $3i$ is turned off to thereby reduce the temperature Ti of the object $2i$. When Ti<Tib at step S4, on the other hand, the current ON/OFF status for the heater is maintained (this operating condition is referred to as "hysteresis"). According to the above-described thermal control of the related art, the temperature Ti of the object $2i$ is controlled within a range approximately between Tia and Tib, as shown in FIG. 8.

In the above-described thermal control system for artificial satellites, when thermal control is simultaneously applied to a plurality of objects, the heaters consume power as shown in FIG. 9. FIG. 9 illustrates an example when three objects are thermally controlled by means of three heaters, respectively. The average power of the three heaters is indicated by a dotted line. In this example, there is a possibility that all three heaters are simultaneously turned on, in which case the peak power consumption by the heaters is far greater than the average power. In view of balance of heat, thermal control should be possible as long as power corresponding to the average power is continuously consumed by the heaters. In the conventional method, however, a significantly large peak power (maximum power) is produced by simultaneously actuating a plurality of heaters, which adversely affects a power system of the artificial satellite.

For example, more than a few of the artificial satellites in operation today actually have 100 or more heaters installed therein. In these artificial satellites, peak power consumption by the heaters reaches several to ten times the average power thereof and therefore cannot be disregarded when compared with power required for various devices installed on the satellite. Accordingly, the power system of the satellite must be designed so that it can supply power sufficient to cover such peak periods, but doing so introduces significant disadvantages regarding weight or cost of the satellite resulting from including such a power source with large maximum supply capacity.

SUMMARY OF THE INVENTION

The present invention was made so as to solve the above problems of the conventional thermal control for an artificial satellite or the like, and aims to reduce the peak energy (maximum energy) which must be supplied to heaters or coolers, which is produced when a plurality of heaters and coolers are simultaneously actuated.

To this end, in accordance with one aspect of the present invention, there is provided a thermal control apparatus comprising a plurality of heaters and/or coolers each controlled to be ON and OFF for changing a temperature of each of a plurality of thermal control objects; a plurality of temperature sensors each provided in each of said plurality of thermal control objects for measuring the temperature of said thermal control object and outputting the measured temperature; a heater and/or cooler ON/OFF priority reading table which, in response to input of said measured temperature, outputs priority for turning on said plurality of heaters and/or coolers, based on order values for turning on said plurality of heaters and/or coolers, predetermined in correspondence with temperature, and said measured temperature; and an energy managing section for turning on the heater or the cooler with high priority and turning off the heater or the cooler with low priority based on said priority output from said ON/OFF priority reading table, such that a sum of energy supplied for actuating said plurality of heaters or coolers does not exceed an energy limit.

In accordance with a second aspect of the present invention, each of said order values is determined for every plurality of temperature levels within a temperature control range established for each of said plurality of thermal control objects.

Further, in accordance with a third aspect of the present invention, said priority is determined based on the speed of temperature response of said plurality of thermal control objects.

Still further, in accordance with a fourth aspect of the present invention, higher priority is assigned to a heater or cooler of a thermal control object with higher speed of temperature response and to a heater or cooler of a thermal control object whose measured temperature is more approximate to a lower limit.

In accordance with a fifth aspect of the present invention, said temperature control range includes a level of upper limit approximate temperature adjoining the upper limit of said temperature control range, and when said measured temperature falls within said level of upper limit approximate temperature, the heater or the cooler provided in the thermal control object having said measured temperature is turned off.

In accordance with a sixth aspect of the present invention, said temperature control range includes a level of OFF maintaining temperature, such that, when said measured temperature falls within said level of OFF maintaining temperature and a heater or cooler provided in the thermal control object having said measured temperature is in an off state, the heater or cooler is controlled to be maintained in an off state.

In accordance with a seventh aspect of the present invention, the upper limit of said level of OFF maintaining temperature adjoins the lower limit of said level of upper limit approximate temperature.

In accordance with an eighth aspect of the present invention, said energy limit is set to be slightly greater than the average energy level for said heaters or coolers in operation.

In accordance with yet another aspect of the present invention, there is provided a space craft provided with said thermal control apparatus for thermally controlling a plurality of thermal control objects.

In accordance with still another aspect of the present invention, there is provided a thermal control method for controlling a plurality of heaters and/or coolers controlled to be ON and OFF for changing the temperature of each of the thermal control object, the temperature of each of said plurality of thermal control objects being measured by one of a plurality of sensors, said thermal control method comprising a first step of determining priority for turning on said heaters or coolers based on said measured temperature; a second step of sequentially adding energy supplied for turning the heater or the cooler on, in the order starting from a heater or a cooler with higher priority of the heaters or the coolers whose priority is determined in said first step; and a third step of sequentially comparing the sum of energy sequentially added in said second step with an energy limit and, when the sum of energy exceeds said energy limit, turning on the heaters or the coolers corresponding to the energy which was added immediately before the time when the energy limit is exceeded, wherein said first, second, and third steps are repeatedly executed.

According to the present invention as described above, it is possible to reduce the level of the peak energy supplied from an energy supply system to heaters and/or coolers.

BRIEF DESCRIPTION OF THE DRAWINGS

These and other objects of the invention will be explained in the description below, in connection with the accompanying drawings, in which:

FIG. 2 is one example of a heater ON/OFF priority determining logic of the present invention;

DETAILED DESCRIPTION OF THE PREFERRED EMBODIMENT

A preferred embodiment of the present invention will be described in further detail with reference to the accompanying drawings.

Figure 1:
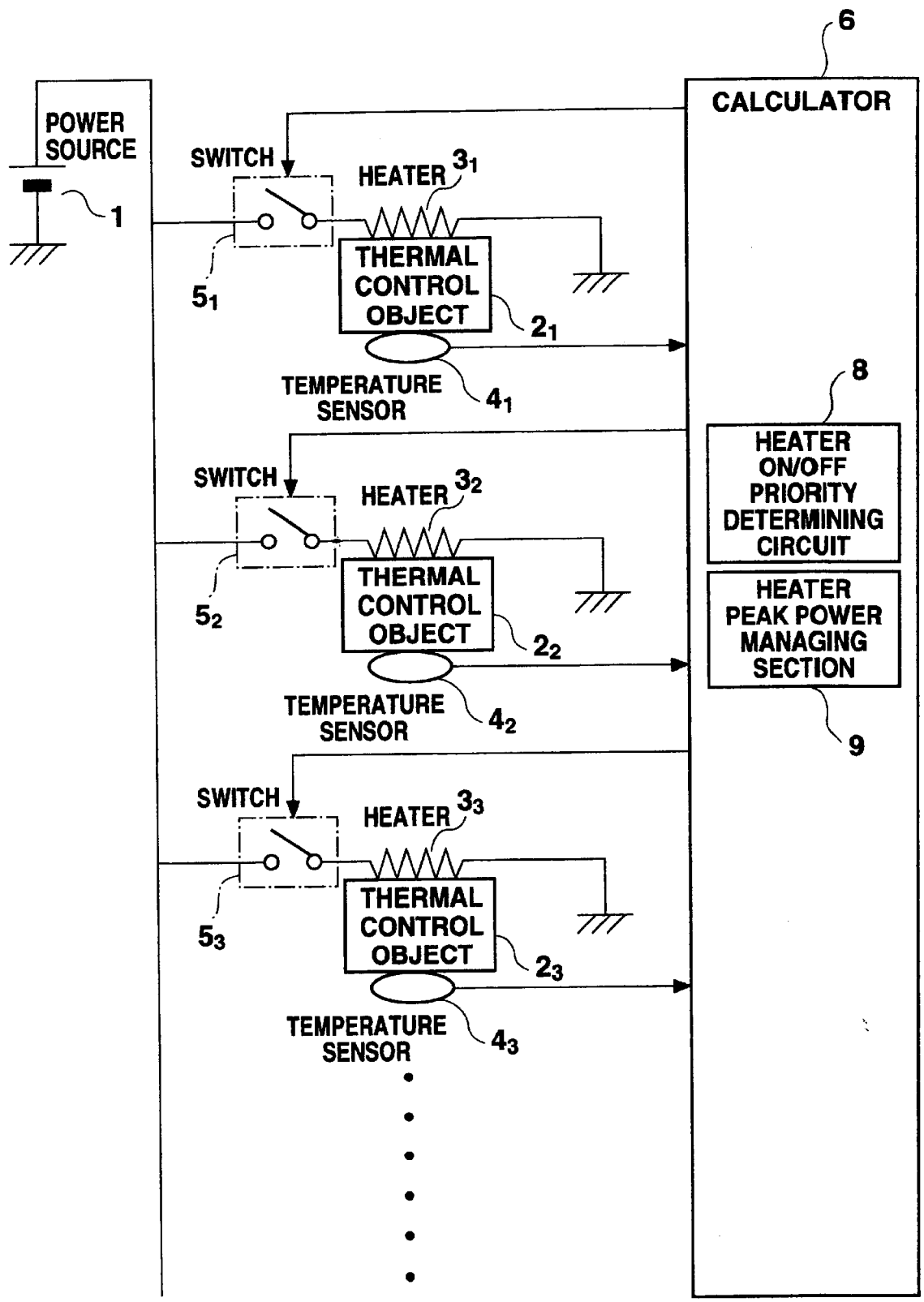
FIG. 1 is a schematic diagram showing a structure of a thermal control apparatus according to one embodiment of the invention.

FIG. 1 shows a structure of the thermal control apparatus according to one embodiment of the present invention. The apparatus includes a power source 1, and a calculator 6 for determining ON/OFF instruction of heaters 3 (which will be described later). The calculator 6 further includes an heater ON/OFF priority determining circuit 8 for the heaters 3, which functions as a heater and/or cooler ON/OFF priority output circuit, and a heater peak power managing section 9. Each of N thermal control objects $2_1, 2_2, 2_3 \ldots 2_i \ldots$ (hereinafter will be referred to as "objects") ($N \geqq 2$) is provided with a heater $3_1, 3_2, 3_3 \ldots 3_i \ldots$, a temperature sensor $4_1, 4_2, 4_3 \ldots 4_i \ldots$, a switch $5_1, 5_2, 5_3 \ldots 5_i \ldots$ for turning on or off the heater 3 according to instructions from the calculator 6. In the drawing, numerals 2~5 have subscripts 1, 2, 3, . . . i . . . in this order from the top, to indicate that a plurality of elements are provided.

Figure 5:
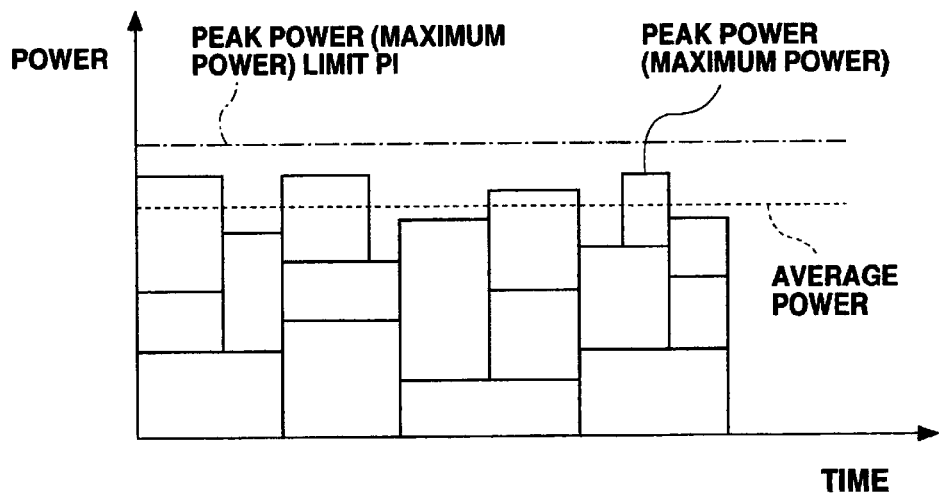
FIG. 5 is a graph depicting a change in the total heater power of the thermal control apparatus of the present invention.
Figure 6:
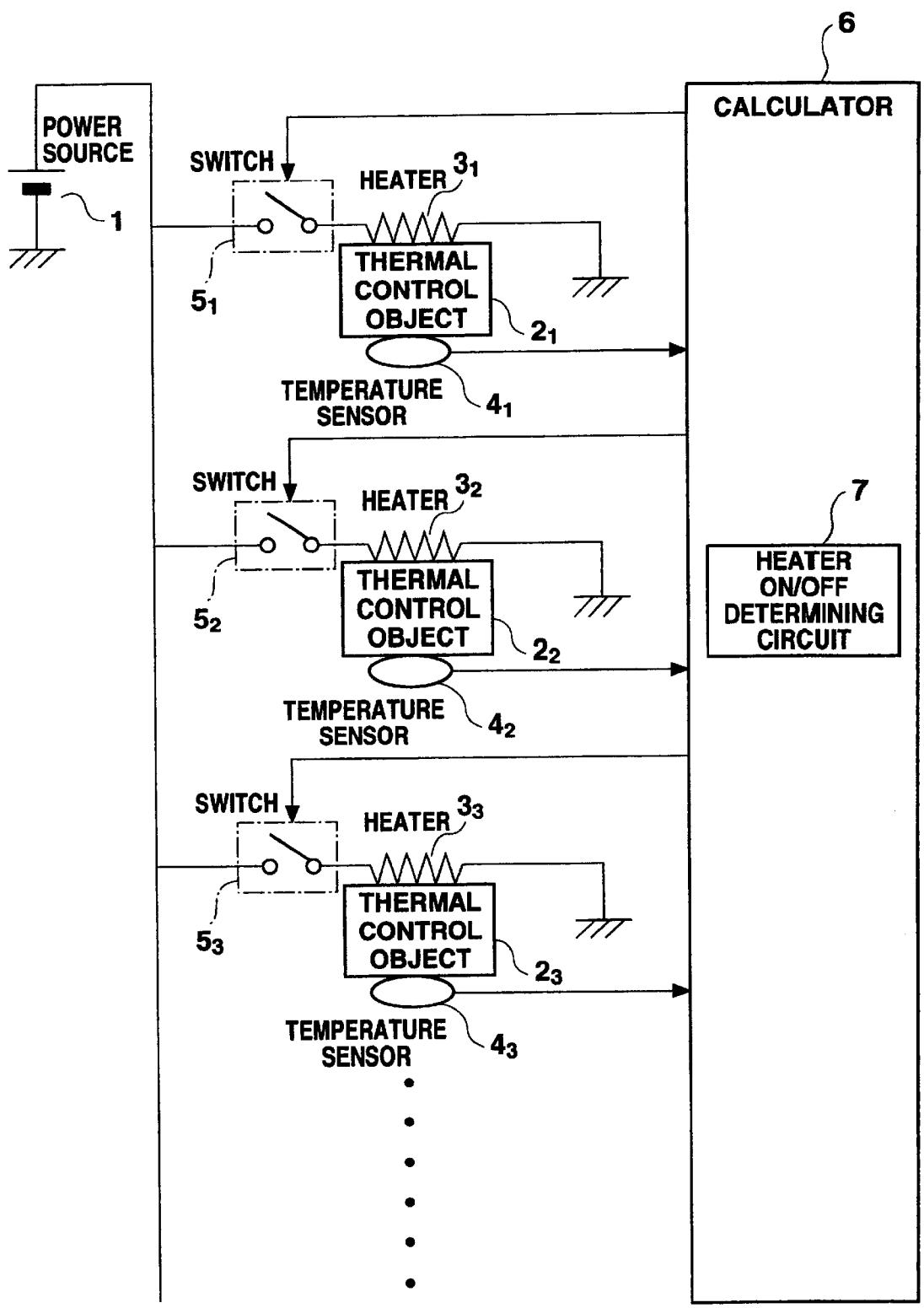
FIG. 6 is a schematic diagram showing a structure of a thermal control apparatus according to a related art.

In this embodiment, the heater ON/OFF priority determining circuit 8 selects candidate heaters to be turned on, and interprets the priority from the order values for turning on heaters, as determined according to the heater ON/OFF priority determining logic installed therein. Then, according to a heater peak power managing logic installed in the heater peak power managing section 9, the heater peak power managing section 9 determines the heaters to be actually turned on, based on the priority determined by the ON/OFF priority determining circuit 8, such that the peak power (maximum power) which is sum of the power consumed by the turned-on heaters does not exceed a limit, and turns the selected heaters on. Although the limit of peak power (maximum power) by all the turned-on heaters (also referred to as "total heaters") must be greater than the average power of the total heaters, the limit can be approximate to the average power due to balance of heat. Accordingly, by setting the limit of the peak power (maximum power) by the total heaters to be slightly greater than the average power thereof, the total power of a plurality of heaters 3 varies in the vicinity of the average power as shown in FIG. 5, so that the peak power (maximum power of the total heaters) can be reduced to a level which is only slightly greater than the average power thereof.

Figure 3:
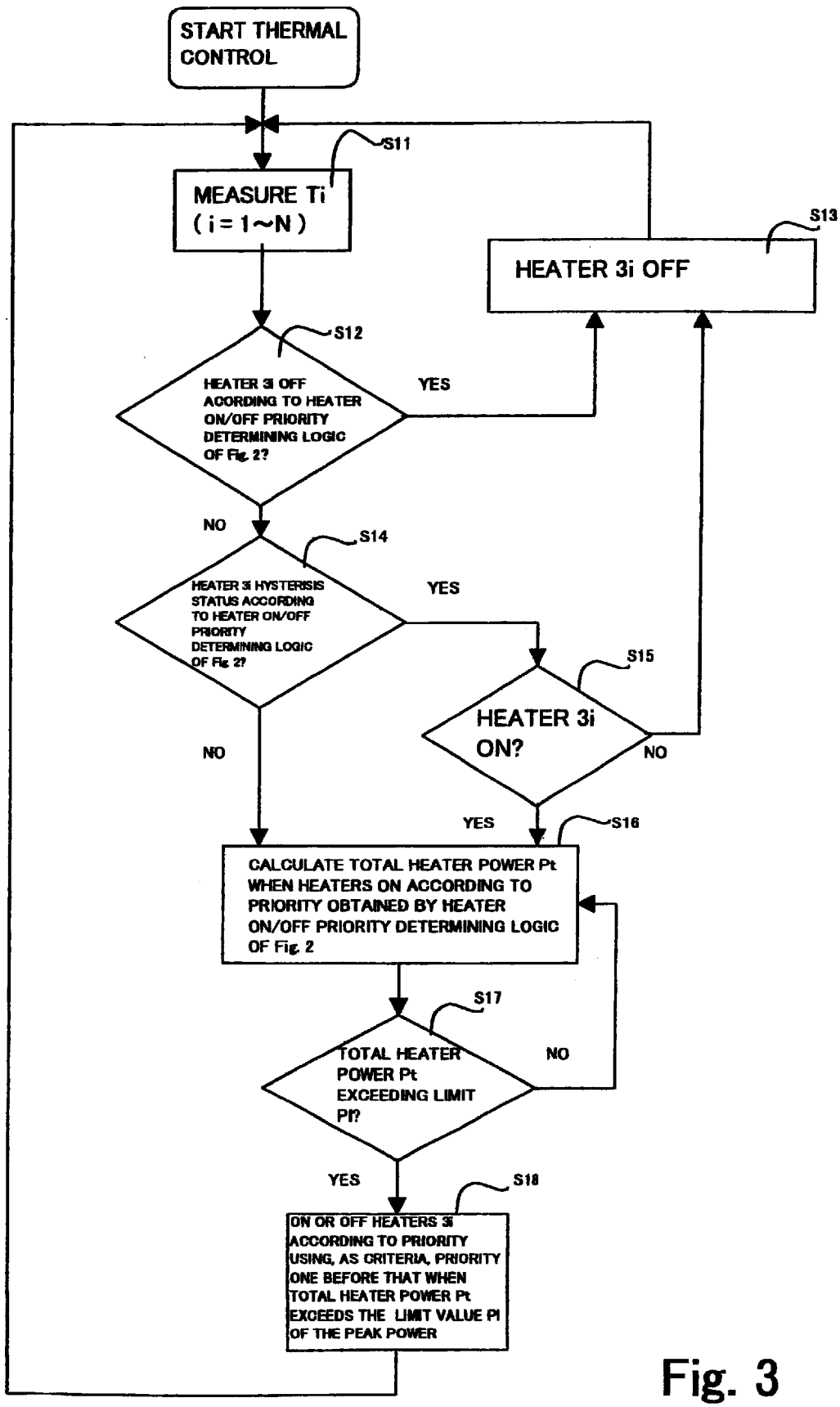
FIG. 3 is one example of a heater peak power managing logic of the present invention.

Referring to FIGS. 2 and 3, examples of the heater ON/OFF priority determining logic in the ON/OFF priority determining circuit 8 and of the heater peak power managing logic in the heater peak power managing section 9 according to this embodiment are illustrated. The specific operation according to these logic will now be with reference to FIGS. 1 to 3.

Referring first to FIG. 2, one example of order determination in the heater ON/OFF priority determining logic will be described. In this example, an order is assigned for each heater regarding turning on, based on temperature response of the thermal control object and a difference $\Delta t$ in temperature between the temperature of the object and the minimum temperature required for turning the heater 3 on (which corresponds to the temperature Tia in the example shown in FIG. 8). In FIG. 2, circled numerals ①, ②, ③, . . . ⑨ indicate order values. In the hysteresis state, the temperature at which the heater 3 is turned on is shifted from the temperature at which the heater 3 is turned off, so that the heater 3 is switched on and off relatively infrequently. In this hysteresis region, the heater 3 maintains the current status as long as the conditions of the heater peak power managing logic, which will be described later, are satisfied. (Specifically, as a rule, the heater which is currently ON remains ON, while the heater which is currently OFF remains OFF) The hysteresis region as described herein is a level of "OFF maintaining temperature". Inclusion of the level of "OFF maintaining temperature" in the temperature control range leads to advantages such as, for example, elimination of unnecessary power consumption and reduction in operation performed by a heater peak power managing section, as will be described later. Further, $\Delta T$ is selected so as to satisfy Tia+3$\Delta T \leq$ Tib, where Tia represents a lower limit control temperature which means a limit in the lower temperature within a temperature control range of the thermal control object $2i$ when performing thermal control by means of heaters, and Tib represents an upper limit control temperature which means a limit in the higher temperature within a temperature control range of the thermal control object $2i$ when performing thermal control by means of heaters. Numeral value "3" in the above expression may appropriately be replaced with other numerical values such that optimum control can be performed in accordance with the number and the temperature range of heaters, as well as temperature response.

To determine the priority of the heaters, the ON/OFF priority determining circuit 8 comprises a digital circuit configured such that digital data which is converted from the temperature of a thermal control object $2i$ measured by the temperature sensor $4i$ by means of an A/D converter are input to a data base which stores a table shown in FIG. 2 for example, and the information on the priority of the corresponding heater $3i$ are output, or a logic circuit configured such that a signal which identifies a thermal control object $2i$ and a temperature value of the thermal control object $2i$ measured by the temperature sensor $4i$ are input therein and information on the priority are output.

For example, when the temperature measured by the temperature sensor $4_1$ is (1.5$\Delta T$+Tia) and the temperature response of the thermal control object $2_1$ is fast, the ON/OFF priority determining circuit 8 reads that the order value is ⑤ from the table shown in FIG. 2, and determines that the heater $3_1$ is a candidate to be turned on due to the temperature difference $\Delta t$ from Tia being $\Delta T \sim 2\Delta T$. On the other hand, when the temperature measured by the temperature sensor $4_2$ is (2.5$\Delta T$+Tia) and the temperature response of the thermal control object $2_2$ is slow, the ON/OFF priority determining circuit 8 interprets that the temperature difference $\Delta t$ from Tia falls within 2$\Delta T \sim 3\Delta T$ and determines that the heater $3_2$ is to be turned off.

The ON/OFF priority determining circuit 8 uses the order values to determine the priority of the heater, such as, for example, the heater $3_1$ this priority indicating an order in which the heaters are to be turned on.

Referring to FIG. 3, an example of thermal control operation of the peak power managing logic of the heater peak power managing section 9, in a state where the peak power of the heaters 3 is reduced, will be described.

First, at step S11, the temperature Ti of each thermal control object $2i$ is measured by the temperature sensor $4i$.

A heater to be turned off is determined according to the heater ON/OFF priority determining logic of FIG. 2 at step S12, and the heater $3i$ is turned off at step S13. Then, with regard to the heater $3i$ which is determined not to be OFF (namely, ON or hysteresis in FIG. 2) according to the heater ON/OFF priority determining logic of FIG. 2, it is determined at step S14 if the heater $3i$ is in a hysteresis state. When the heater $3i$ is in a hysteresis state and is currently OFF (step S15), the heater $3i$ remains OFF. Thus, all the heaters 3 to be OFF are excluded, and consequently the heater which is determined to be ON according to the heater ON/OFF priority determining logic at step S14 and the heater which is determined to be in a hysteresis state and is now ON at step S15 proceed to the subsequent step S16 as candidate heaters $3j$ to be turned on. For example, assuming that the temperature of the heater $3_1$ is (0.5$\Delta T$+Tia) and temperature response of the corresponding thermal control object $2_1$ is fast, that the temperature of the heater $3_2$ is (2.5$\Delta T$+Tia) and temperature response of the corresponding thermal control object $2_2$ is medium, and that the temperature of the heater $3_3$ is (3$\Delta T$+Tia) and temperature response of the corresponding thermal control object $2_3$ is slow, the order values of the heaters $3_1$, $3_2$, $3_3$ according to the logic of FIG. 2 are ②, ⑨ and OFF, respectively. Accordingly, the priority of the candidate heaters $3j$ to be turned on are, in order, heater $3_1$ (order value ②) and heater $3_2$ (order value ⑨).

At step S16, the heater power Pj of each of the candidate heaters $3j$ is calculated using a voltage V and resistance Rj thereof according to the following expression (1).

$$Pj = V^2/Rj \qquad (1)$$

Then, using the heater power Pj of each heater $3j$, the total power Pt of the heaters $3j$ when they are turned on in the order of priority (①,②,③, . . . , $M_{(h-1)}$, $m_h$, . . . ⑨) obtained based on the ON/OFF priority logic of FIG. 2 is found. For example, provided that the sum of the heater power of the heaters $3j$ with order ① is $\Sigma Pj$(①), the sum of the heater power of heaters $3j$ with order ② is $\Sigma Pj$(②), and the sum of the heater power of heaters $3j$ with order value $m_h$ is $\Sigma Pj(m_h)$, the total power Pt of the heaters with order values ① to $m_h$ is added in order of the priority as shown in the following expression (2).

$$Pt = \Sigma Pj(①) + \Sigma Pj(②) + \ldots + \Sigma Pj(m_h) \qquad (2)$$

At step S17, it is determined when the total power Pt of the heaters obtained by sequentially adding the heater power of each candidate heater $3j$ in the priority order exceeds the limit value Pl of the peak power (maximum power), and the value of order value $m_h$ of the heater whose addition caused the power to exceed the limit is determined. At step S18, the heaters $3j$ with order values ① to $m_{(h-1)}$, which is one before the order value $m_h$, are turned on whereas the heaters $3j$ with the order value $m_h$ and after that are turned off.

In this manner, the total power Pt of the heaters falls within the limit Pl as indicated by the following expression (3), and a series of heater ON/OFF setting operations by means of the heater ON/OFF priority determining logic and the peak power managing logic are completed.

$$Pt = \Sigma Pj(①) + \Sigma Pj(②) + \ldots + \Sigma Pj(m_{(h-1)}) < Pl \qquad (3)$$

(wherein it is assumed a sum of the heater power of heaters $3j$ with order value ① is $\Sigma Pj$(①), a sum of the heater power of heaters $3j$ with order value ② is $\Sigma Pj$(②), and a sum of the heater power of heaters $3j$ with order value $m_h$ is $\Sigma Pj(m_h)$)

Then, the process returns to the first step S11 where the temperature Ti of each thermal control object is measured, and the above-mentioned series of operations are repeated.

Figure 4:
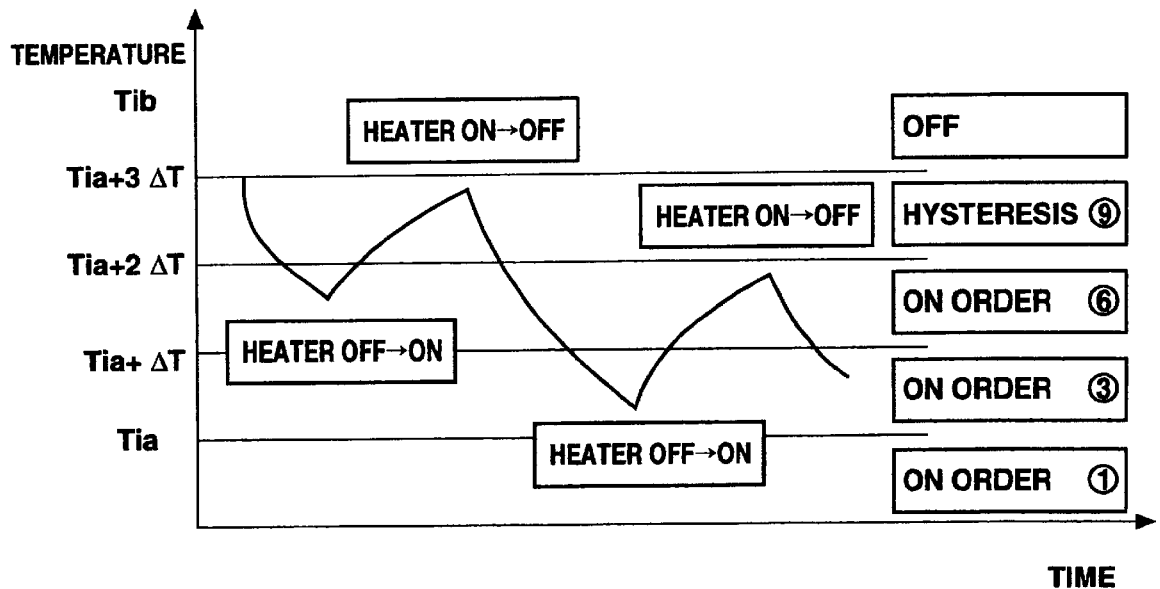
FIG. 4 is a graph depicting temperature response of the thermal control apparatus of the present invention.
Figure 7:
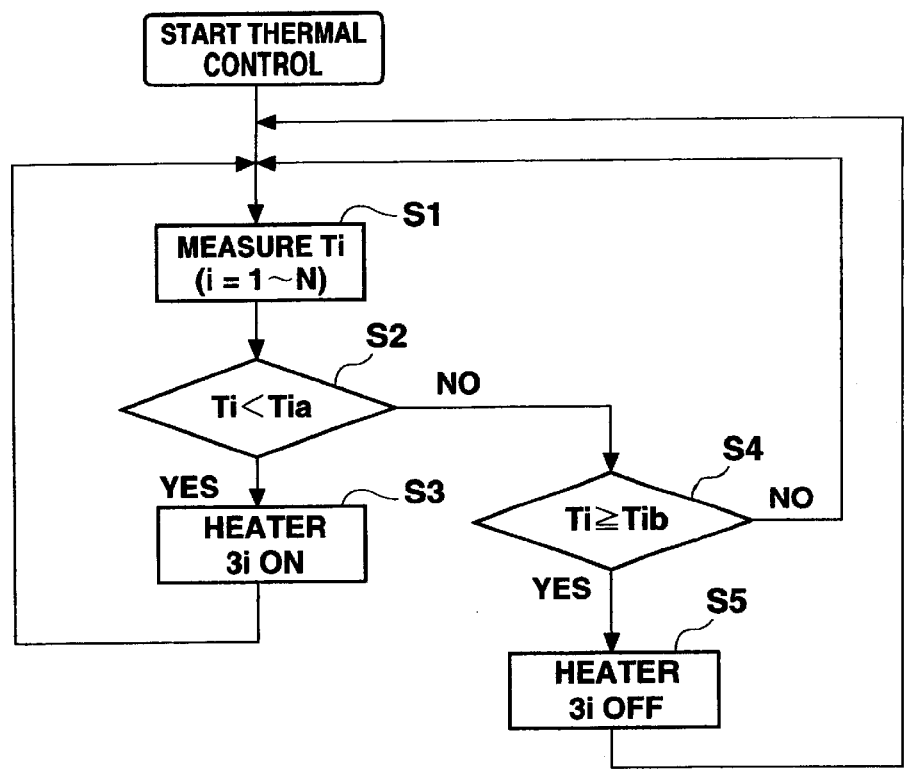
FIG. 7 is one example of a heater ON/OFF logic of a conventional thermal control apparatus.
Figure 8:
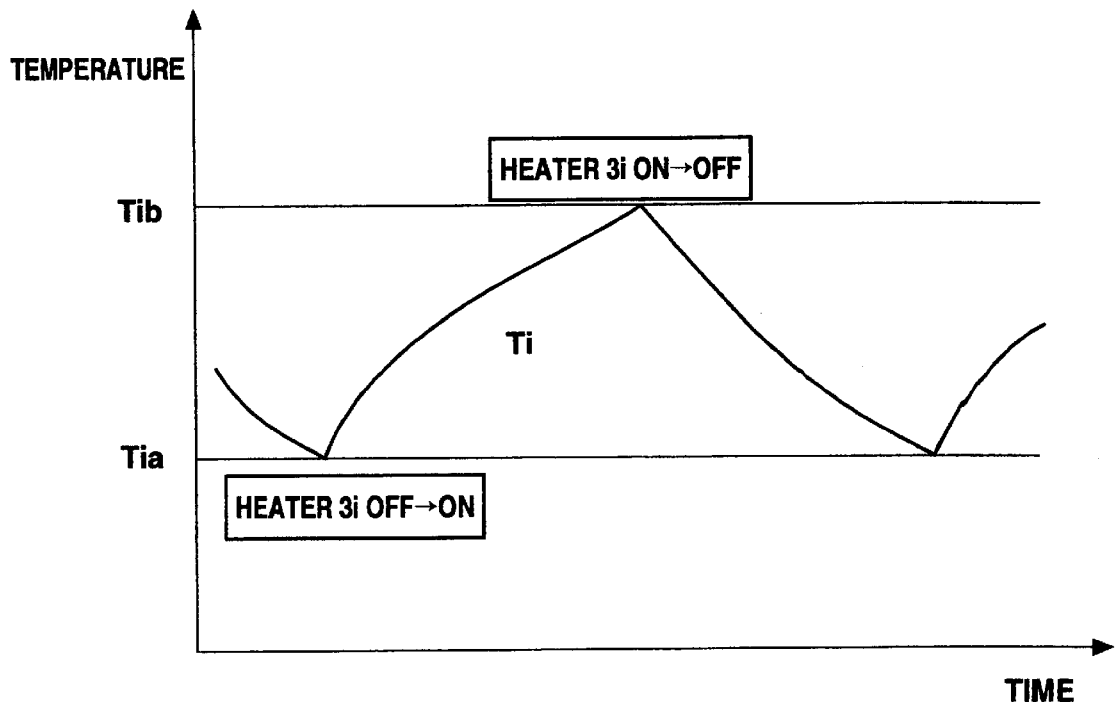
FIG. 8 is a graph depicting temperature response of a related art thermal control apparatus.

According to the foregoing process, the temperature Ti of a thermal control object varies as shown in FIG. 4. FIG. 4 shows the temperature response when one example of thermal control of the present invention is performed for a thermal control object with medium temperature response in FIG. 2. In contrast to the conventional thermal control in which the temperature of the thermal control object varies in a range between Tia~Tib as shown in FIG. 8, in the present invention, ON/OFF of the heaters is generally performed sufficiently within the range of Tia~Tib and the temperature of the thermal control objects also falls sufficiently within the range of Tia~Tib. According to the logic of related art shown FIG. 7, the heater is not turned on until the temperature drops to Tia and must be always turned on once the temperature drops to Tia. According to the present invention, on the other hand, as shown in FIG. 2, the heaters are allowed to be turned on before the temperature drops to Tia, in which case the heaters need not necessarily be turned on, and it is therefore possible to provide a significant degree of freedom for ON/OFF of the heaters.

In addition, when the total power Pt of the heaters is too small with respect to the limit Pl of the peak power (maximum power), the heaters can be turned on according to a priority, even before the temperature drops to Tia. Contrary to this, when the total power Pt exceeds the limit value Pl of the peak power (maximum power), the heaters can be turned off in the reversed order of priority.

Figure 9:
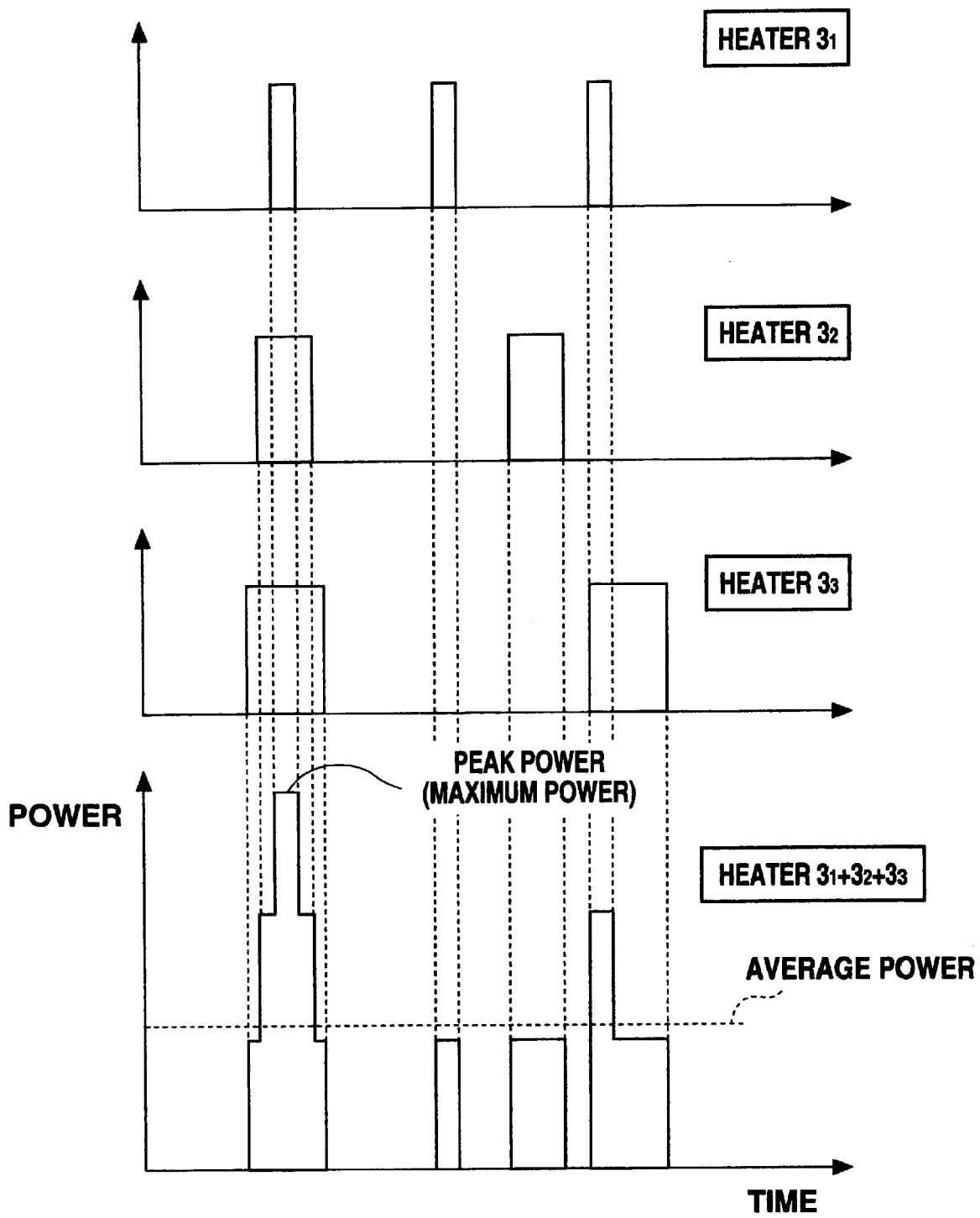
FIG. 9 is a graph depicting heater power of a related art thermal control apparatus.

As described above, the total heater power Pt is controlled to fall within a limit Pl of the peak power (maximum power) which is set to be slightly greater than the average power of the heaters while providing great degree of freedom for heater ON/OFF. Because of this, the total heater power Pt varies within a range near the average power as shown in FIG. 5. While in the conventional system, the peak power (maximum power) is significantly greater than the average power as shown in FIG. 9, in the present invention, the peak power (maximum power) can be reduced to a level only slightly greater than the average power as shown in FIG. 5.

According to the present invention, it is therefore possible to reduce the heater peak power (maximum power) required for thermally controlling a space craft such as an artificial satellite, which leads to a reduction in the maximum power of the power system of the space craft which supplies power to the heaters, thereby simplifying the design of the power system. This advantage also results in a reduction in the weight of a power source to be installed on a space craft while lowering cost.

In particular, there has been proposed a system in which docking is performed in a space station or the like. In such a system, electrical power is often supplied from one docked object to another, and consumption of power by the object to which power is supplied must be strictly managed. When the thermal control apparatus of the present embodiment is used for a transporter (space craft) to be docked to a space station, for example, it is possible to reduce the heater power. Therefore, it is possible to manufacture a space craft which can meet the above-described strict requirements for power management.

Although an example heater ON/OFF priority determining logic as shown in FIG. 2 is used in the foregoing example, other logic may alternatively be used as long as such logic satisfies the requirements of the invention. Further, when a number of thermal control objects are provided, many of the heaters may be assigned in the same rank of temperature response when the above-described three-level ranking is adopted. If this is the case, the temperature response may be subdivided into four or more ranks. Alternatively, items in the same rank may be further ranked according to another criteria. (For example, another three-level ranking is further applied in the same rank, such that an order of ①-1, ①-2, ①-3, ②-1, ②-2, ②-3, ... ⑨-1, ⑨-2, ⑨-3 is set.)

In the foregoing example, heaters are used as a heat source for thermal control. The present invention, however, is applicable to other types of heating apparatuses using electrical power. Further, the concept of the present invention is also applicable to thermal control by means of a cooling apparatus using an electrical power, to thereby reduce the peak power of the cooling apparatus. In case of thermal control by means of coolers, contrary to thermal control by means of heaters, the above-mentioned lower limit control temperature Tia means the limit in the higher temperature within a temperature control range of the thermal control object $2i$, and the term "lower limit" refers to "the limit value of higher temperature". Similarly, the above-mentioned upper limit control temperature Tib means the limit in the lower temperature within a temperature control range of the thermal control object $2i$, and the term "upper limit" refers to "the limit value of lower temperature". For thermal control by means of coolers, $\Delta T$ is selected such that it satisfies Tia$-3\Delta T \leq$Tib. However, numeral value 3 in the foregoing expression may be appropriately replaced with other numeral values such that optimum control can be performed in accordance with the number and the temperature range of coolers as well as temperature response. Further, the foregoing example described reduction in peak power of a thermal control apparatus to which electrical power is supplied as energy. However, it is matter of course that the concept of the present invention is also applicable to reduction in the peak amount of other energy to be supplied such as gas or petroleum.

While the preferred embodiment of the present invention has been described using specific terms, such description is for illustrative purposes only, and it is to be understood that changes and variations may be made without departing from the spirit or scope of the appended claims.

What is claimed is:

1. A thermal control apparatus comprising:
   a plurality of heaters and/or coolers each controlled to be on and off for changing a temperature of each of a plurality of thermal control objects;
   for each of said plurality of thermal control objects, a temperature sensor for measuring the temperature of the thermal control object and for outputting the measured temperature;
   a heater and/or cooler ON/OFF priority output circuit which, in response to input of said measured temperature, outputs a priority for turning on each of said plurality of heaters and/or coolers, based on said measured temperature and a predetermined order value for turning on said plurality of heaters and/or coolers in correspondence with temperature; and
   an energy managing section for turning on a heater or cooler with high priority and turning off a heater or cooler with low priority based on said priority output from said ON/OFF priority output circuit, such that the sum of energy supplied for actuating said plurality of heaters or coolers does not exceed a predetermined energy limit.

2. A thermal control apparatus according to claim 1, wherein said order values are determined for each of a plurality of temperature levels within a temperature control range established for each of said plurality of thermal control objects.

3. A thermal control apparatus according to claim 1, wherein said priority is determined based on the speed of temperature response of said plurality of thermal control objects.

4. A thermal control apparatus according to claim 3, wherein higher priority is assigned to a heater or cooler of a thermal control object with higher speed of temperature response and to a heater or cooler of a thermal control object whose measured temperature is more approximate to a lower limit.

5. A thermal control apparatus according to claim 2, wherein said temperature control range includes a level of upper limit approximate temperature adjoining the upper limit of said temperature control range, and when said measured temperature falls within said level of upper limit approximate temperature, a heater or cooler provided in the thermal control object having said measured temperature is turned off.

6. A thermal control apparatus according to claim 2, wherein said temperature control range includes a level of OFF maintaining temperature, such that, when said measured temperature falls within said level of OFF maintaining temperature and a heater or cooler provided in the thermal control object having said measured temperature is in an off state, the heater or cooler is controlled to be maintained in an off state.

7. A thermal control apparatus according to claim 6, wherein the upper limit of said level of OFF maintaining temperature adjoins the lower limit of said level of upper limit approximate temperature.

8. A thermal control apparatus according to claim 1, wherein said energy limit is set to be slightly greater than the average energy level for said heaters or coolers in operation.

9. A space craft provided with a thermal control apparatus according to claim 1 for thermally controlling a plurality of thermal control objects.

10. A thermal control method for controlling a plurality of heaters and/or coolers and controlled to be on and off for changing the temperature of the thermal control object, the temperature of each of said plurality of thermal control objects being measured by each of a plurality of sensors, said thermal control method comprising:
    a first step of determining priority for turning on said heaters or coolers based on said measured temperature;
    a second step of sequentially adding energy supplied for turning the heater or the cooler on, in the order starting from a heater or a cooler with higher priority of the heaters or the coolers whose priority is determined in said first step; and
    a third step of sequentially comparing the sum of energy sequentially added in said second step with an energy limit and, when the sum of energy exceeds said energy limit, turning on the heaters or the coolers corresponding to the energy which was added immediately before the time when the energy limit is exceeded,
    wherein said first, second, and third steps are repeatedly executed.

11. The thermal control apparatus according to claim 1, wherein the priority output from the ON/OFF priority output circuit is stored in a reading table associated with the ON/OFF priority output circuit.

* * * * *